United States Patent
Niu et al.

(10) Patent No.: US 8,169,541 B2
(45) Date of Patent: May 1, 2012

(54) METHOD OF CONVERTING FRAME RATE OF VIDEO SIGNAL

(75) Inventors: Sheng-Chun Niu, Sinshih Township, Tainan County (TW); Ling-Hsiu Huang, Sinshih Township, Tainan County (TW)

(73) Assignee: Himax Media Solutions, Inc., Tainan County (TW)

( * ) Notice: Subject to any disclaimer, the term of this patent is extended or adjusted under 35 U.S.C. 154(b) by 712 days.

(21) Appl. No.: 12/330,733

(22) Filed: Dec. 9, 2008

(65) Prior Publication Data

US 2010/0141832 A1 Jun. 10, 2010

(51) Int. Cl.
*H04N 7/01* (2006.01)

(52) U.S. Cl. ........ 348/441; 348/458; 348/459; 348/451; 348/448; 348/538; 348/699; 348/700; 348/701; 382/300

(58) Field of Classification Search .................. None
See application file for complete search history.

(56) References Cited

U.S. PATENT DOCUMENTS

| 6,867,814 B2* | 3/2005 | Adams et al. ................. 348/448 |
| 2003/0194151 A1* | 10/2003 | Wang et al. ................... 382/300 |

* cited by examiner

*Primary Examiner* — Jefferey Harold
*Assistant Examiner* — Omer Khalid
(74) *Attorney, Agent, or Firm* — Thomas, Kayden, Horstemeyer & Risley, LLP

(57) ABSTRACT

A method of converting a frame rate of a video signal includes the steps of: receiving a pulldown film sequence existing in or converted from a sequence of successive-in-time frames of the video signal, in which the pulldown film sequence comprises a plurality of diverse original frames each having a corresponding number of duplicate frames; modifying the original frames; performing estimation of at least one motion vector associated with the modified original frames; and interpolating new frames between the modified original frames in accordance with the motion vector.

8 Claims, 5 Drawing Sheets

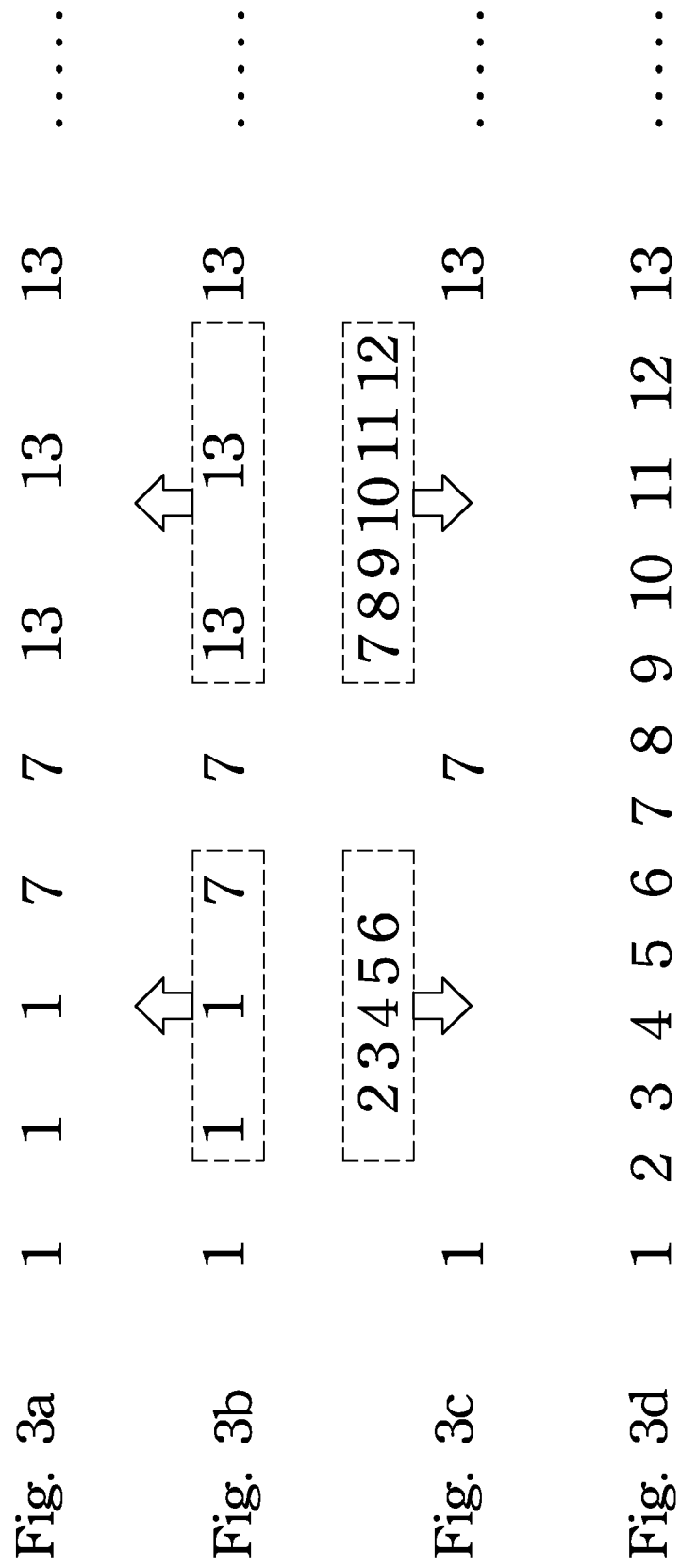

METHOD OF CONVERTING FRAME RATE OF VIDEO SIGNAL

BACKGROUND

1. Field of Invention

The present invention relates to a method of frame rate up conversion (FRUC). More particularly, the present invention relates to a method of motion-compensated interpolation for frame rate up conversion.

2. Description of Related Art

In frame rate up conversion, a frame is interpolated between two original frames when the information of the two original frames can be obtained. Specifically, once motion vectors of two sequential frames are analyzed and estimated, correlated motion of the sequential frames can be thus obtained and a new frame can be then interpolated between the sequential frames according to the correlated motion or motion vectors.

Presently available source material like motion-picture film is recorded at a temporal rate of 24 frames/second and video source material is recorded at a rate of 30 frames/second. In order to perform the material having the temporal rate of 24 or 30 Hz with large screen viewing, without affecting the displayed image quality, prior arts provide frame rate up conversion from 24/30 Hz to 60 Hz. However, if the displayed image quality is required to be further improved, the frame rate of 60 Hz must be converted even higher. At the moment, there is a need for the frame rate up conversion from 60 Hz to, for example, 120 Hz.

SUMMARY

In accordance with one embodiment of the present invention, a method of converting a frame rate of a video signal is provided. The method comprises the steps of: receiving a pulldown film sequence existing in or converted from a sequence of successive-in-time frames of the video signal, in which the pulldown film sequence comprises a plurality of diverse original frames each having a corresponding number of duplicate frames; modifying the original frames; performing estimation of at least one motion vector associated with the modified original frames; and interpolating new frames between the modified original frames in accordance with the motion vector.

In accordance with another embodiment of the present invention, a method of converting a frame rate of a video signal is provided. The method comprises the steps of: receiving a sequence of frames existing in or converted from the video signal; performing motion estimation of the sequence of frames; determining based on the motion estimation if the sequence of frames being a pulldown film sequence comprising a plurality of diverse original frames each having a corresponding number of duplicate frames; modifying the original frames when the sequence of frames being the pulldown film sequence; performing estimation of at least one motion vector associated with the modified original frames; and interpolating new frames between the modified original frames in accordance with the motion vector.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows:

FIGS. 3a-3d illustrate a process of converting an original film sequence into a new film sequence by means of the method shown in FIG. 2, according to one embodiment of the present invention;

FIGS. 4a-4d illustrate a process of converting an original film sequence into a new film sequence by means of the method shown in FIG. 2, according to another embodiment of the present invention.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
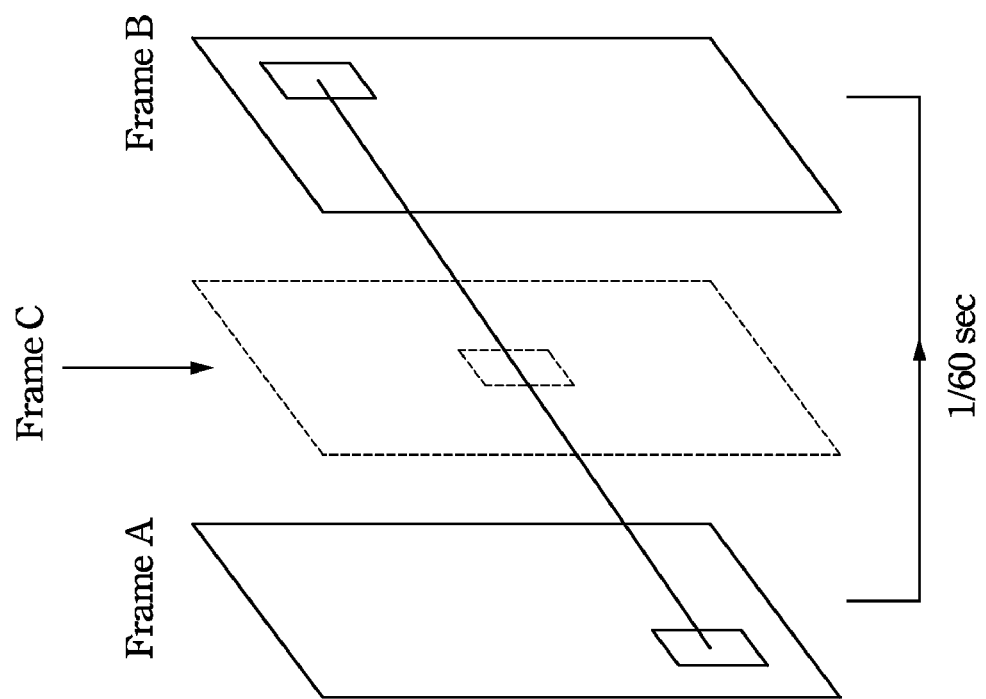
FIG. 1 illustrates frame interpolation between sequential frames according to one embodiment of the present invention.

Following embodiments disclose a method of converting a frame rate of a video signal by frame rate up conversion (FRUC). In the frame rate up conversion, a frame is interpolated between two original frames when the information of the two original frames can be obtained. FIG. 1 illustrates frame interpolation between sequential frames according to one embodiment of the present invention. As shown in FIG. 1, when estimation of the motion vectors of two sequential frames A and B is performed, correlated motion of the sequential frames A and B can be obtained, and a new frame C can be then interpolated based on the correlated motion of the sequential frames A and B.

Figure 2:
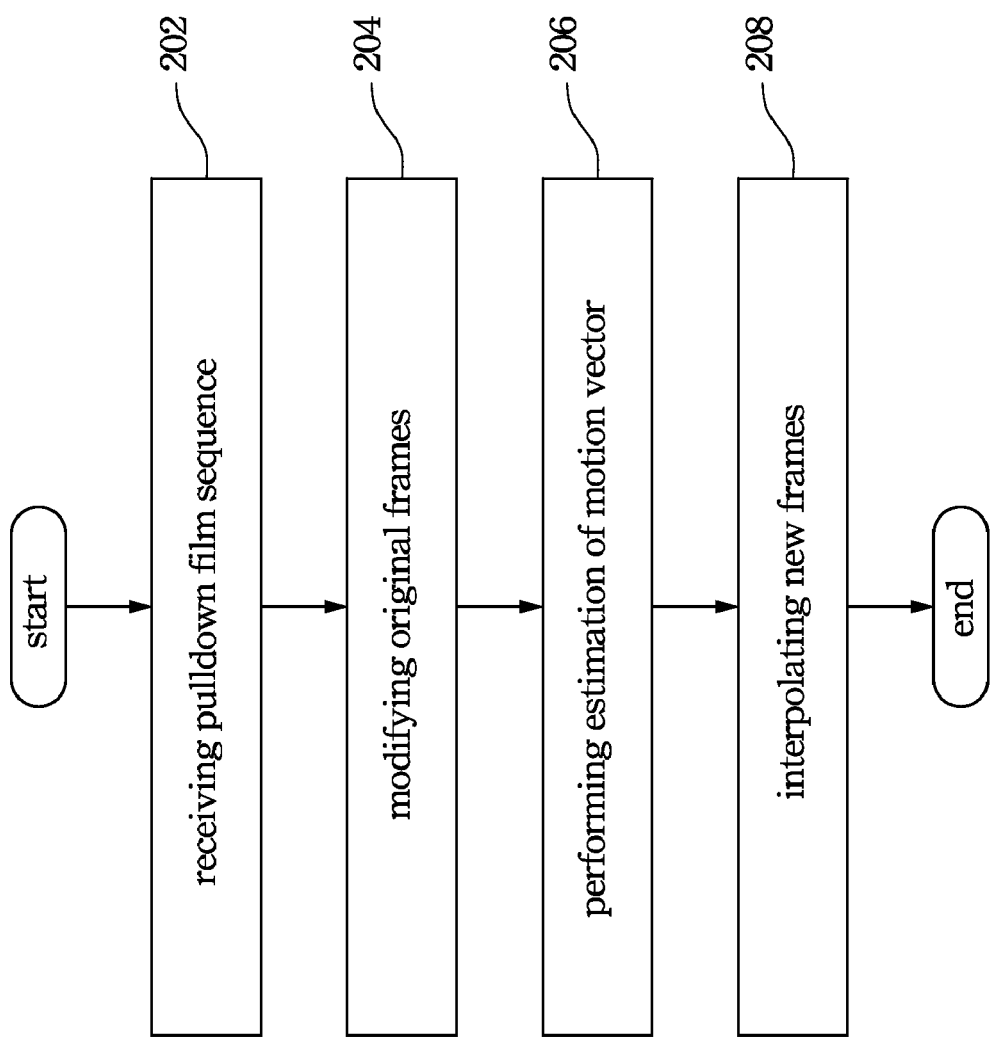
FIG. 2 illustrates a flow chart of a method of converting a frame rate of a video signal according to one embodiment of the present invention.

FIG. 2 illustrates a flow chart of a method of converting a frame rate of a video signal according to one embodiment of the present invention. First, a pulldown film sequence existing in or converted from a sequence of successive-in-time frames of the video signal is received (Step 202), in which the pulldown film sequence includes a plurality of diverse original frames each having a corresponding number of duplicate frames. Then, the original frames in the pulldown film sequence are modified (Step 204). After that, estimation of at least one motion vector associated with the modified original frames is performed (Step 206). Then, new frames between the modified original frames are interpolated in accordance with the estimation result of the motion vector (Step 208).

The following are examples of performing frame rate-up conversion from 60 Hz to 120 Hz. FIGS. 3a-3d illustrate a process of converting an original film sequence into a new film sequence by means of the method shown in FIG. 2, according to one embodiment of the present invention. As shown in FIG. 3a, a 3:2 pulldown film sequence 1 1 1 7 7 13 13 13 . . . , having a frame rate of 60 Hz, existing in or converted from a sequence of successive-in-time frames of the video signal is first received, in which the number 1, 7, 13, etc. exemplarily denote the positions (or orders) of the frames in the sequence. Then, the original frames in the pulldown film sequence are modified. In the present embodiment, the duplicate frames of the original frames, i.e. 1, 7, 13, . . . , in the pulldown film sequence are removed, as shown in FIG. 3b.

After the duplicate frames of the original frames are removed, the estimation of the motion vectors associated with two adjacent remaining frames, i.e. 1 and 7, 7 and 13, etc., of the original frames is performed. In the present embodiment, after the estimation is performed, new successive-in-time frames are interpolated between two adjacent remaining frames of the original frames in accordance with the estimation of the motion vectors. For example, frames 2 3 4 5 6 are interpolated between frames 1 and 7, and frames 7 8 9 10 11 12 are interpolated between frames 7 and 13, and so on, as shown in FIG. 3c. Afterward, a new film sequence 1 2 3 4 5 6 7 8 9 11 12 13 . . . , having a frame rate of 120 Hz, is thus generated, as shown in FIG. 3d.

FIGS. 4a-4d illustrate a process of converting an original film sequence into a new film sequence by means of the method shown in FIG. 2, according to another embodiment of the present invention. Similarly, as shown in FIG. 4a, the 3:2 pulldown film sequence 1 1 1 7 7 13 13 13 . . . , having the frame rate of 60 Hz, is first received. Then, the original frames in the pulldown film sequence are modified. In the present embodiment, each of the diverse original frames is selectively duplicated such that each of the diverse original frames has a same number of duplicate frames. For example, frame 1 and 13 both originally has three frames and frame 7 originally has two frames, so frame 7 is duplicated to have three frames as same as frame 1 and 13, as shown in FIG. 4b.

After the original frames are modified, the estimation of the motion vectors associated with two adjacent diverse frames, i.e. 1 and 7, 7 and 13, etc., of the modified frames is performed. In the present embodiment, after the estimation is performed, a number of new frames between two adjacent diverse original frames of the modified original frames are interpolated in accordance with the motion vectors. Notably, the number of new frames is smaller than the number of duplicate frames. For example, frames 4 4 are interpolated between two adjacent frames 1 and 7, and frames 10 10 are interpolated between two adjacent frames 7 and 13, and so on, in which the number of frame 4, 10, etc., is smaller than the number of frame 1, 7, 13, etc., as shown in FIG. 4c. Afterward, a new 3:2 pulldown film sequence 1 1 1 4 4 7 7 7 10 10 13 13 13 . . . , having the frame rate of 120 Hz, is thus generated, as shown in FIG. 3d.

Despite that the foregoing embodiments are carried out with the 3:2 pulldown film sequence, they are illustrative of the present invention rather than limiting of the present invention. A 2:2 pulldown film sequence can also be employed in the present invention in a similar way.

Figure 5:
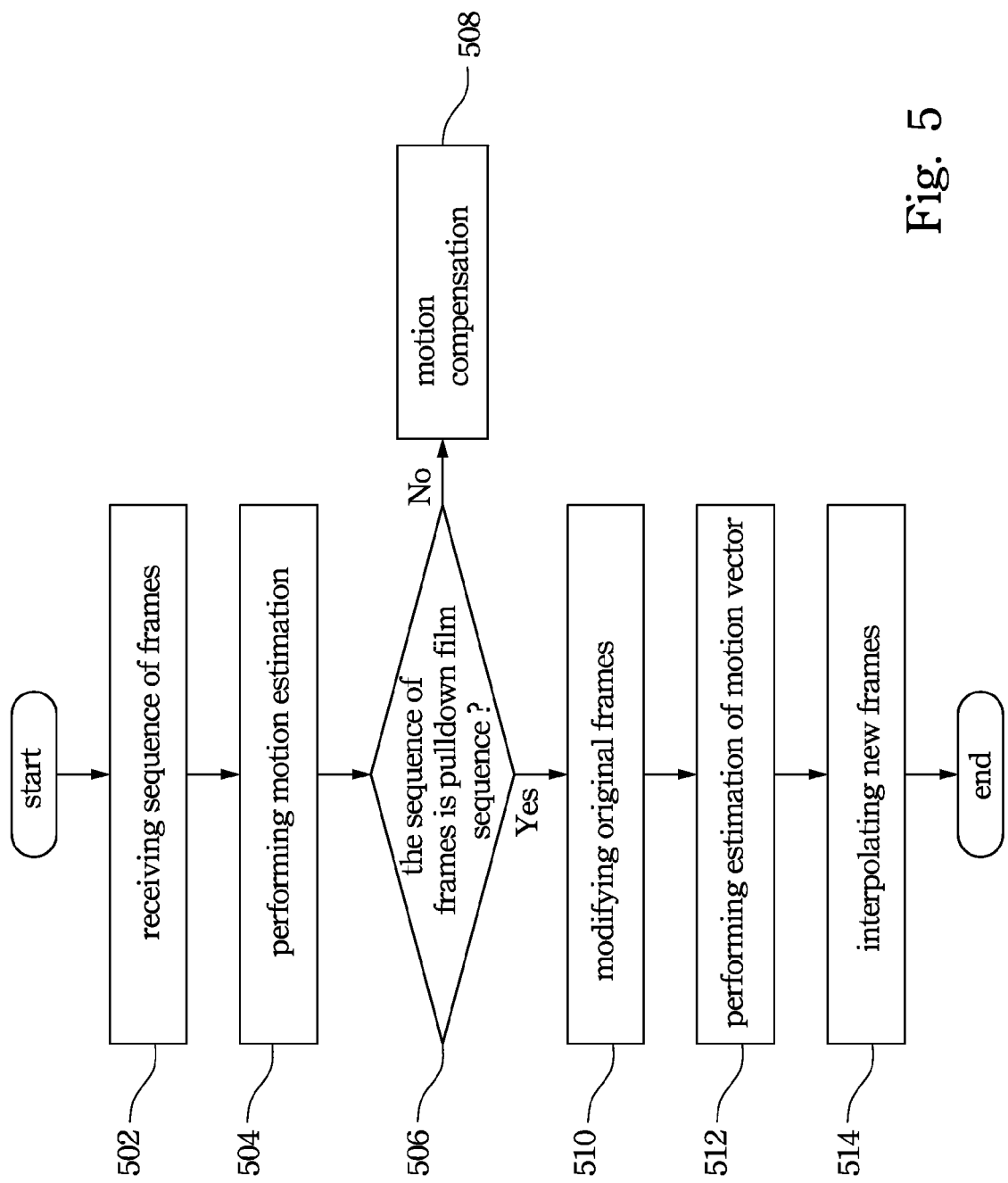
FIG. 5 illustrates a flow chart of a method of converting a frame rate of a video signal according to another embodiment of the present invention.

FIG. 5 illustrates a flow chart of a method of converting a frame rate of a video signal according to another embodiment of the present invention. First, a sequence of frames existing in or converted from the video signal is received (Step 502). Then, motion estimation of the sequence of frames is performed (Step 504). After that, whether the sequence of frames is a pulldown film sequence or not is determined based on the performed motion estimation (Step 506), in which the sequence of frames includes a plurality of diverse original frames each having a corresponding number of duplicate frames, e.g. the 3:2 pulldown film sequence 1 1 1 7 7 13 13 13 . . . shown in FIG. 3a. If the sequence of frames is a normal sequence instead of a pulldown film sequence, the sequence of frames is then processed by means of conventional motion compensation (Step 508). On the other hand, if the sequence of frames is a pulldown film sequence, the original frames in the sequence are then modified (Step 510). After that, estimation of at least one motion vector associated with the modified original frames is performed (Step 512). Then, new frames between the modified original frames are interpolated in accordance with the estimation result of the motion vector (Step 514). Notably, the foregoing Steps 510, 512 and 514 are similar to the Steps 204, 206 and 208, shown in FIG. 2, respectively.

For the foregoing embodiments, the method of converting a frame rate of a video signal can be employed to convert a sequence having a high frame rate of, for example, 60 Hz into a new sequence having an even higher frame rate of, for example, 120 Hz, so as to improve the quality of the displayed motion-picture film.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A method of converting a frame rate of a video signal, comprising the steps of:

receiving a pulldown film sequence existing in or converted from a sequence of successive-in-time frames of the video signal, wherein the pulldown film sequence comprises a plurality of diverse original frames each having a corresponding number of duplicate frames;

modifying the original frames, wherein the modifying step further comprises selectively duplicating each of the diverse original frames such that each of the diverse original frames has a first number of duplicate frames;

performing estimation of at least one motion vector associated with the modified original frames wherein the step of performing estimation further comprises performing estimation of at least one motion vector associated with two adjacent diverse frames of the modified original frames; and interpolating new frames between the modified original frames in accordance with the motion vector, wherein the interpolating step further comprises interpolating a second number of new frames between two adjacent diverse original frames of the modified original frames in accordance with the motion vector.

2. The method as claimed in claim 1, wherein the second number of new frames is smaller than the first number of duplicate frames.

3. The method as claimed in claim 1, wherein the pulldown film sequence is a 3:2 pulldown film sequence.

4. The method as claimed in claim 1, wherein the pulldown film sequence is a 2:2 pulldown film sequence.

5. A method of converting a frame rate of a video signal, comprising the steps of:

receiving a sequence of frames existing in or converted from the video signal;

performing motion estimation of the sequence of frames;

determining based on the motion estimation if the sequence of frames being pulldown film sequence comprising a plurality of diverse original frames each having a corresponding number of duplicate frames;

modifying the original frames when the sequence of frames being pulldown film sequence, wherein the modifying step further comprises selectively duplicating each of the diverse original frames such that each of the diverse original frames has a first number of duplicate frames;

performing estimation of at least one motion vector associated with the modified original frames, wherein the step of performing estimation further comprises performing estimation of at least one motion vector associated with two adjacent diverse frames of the modified original frames; and interpolating new frames between the modified original frames in accordance with the motion vector, wherein the interpolating step further comprises interpolating a second number of new frames between two adjacent diverse original frames of the modified original frames in accordance with the motion vector.

6. The method as claimed in claim 5, wherein the second number of new frames is smaller than the first number of duplicate frames.

7. The method as claimed in claim 5, wherein the pulldown film sequence is a 3:2 pulldown film sequence.

8. The method as claimed in claim 5, wherein the pulldown film sequence is a 2:2 pulldown film sequence.

* * * * *